(12) United States Patent
Sathyanathan et al.

(10) Patent No.: US 8,572,594 B2
(45) Date of Patent: Oct. 29, 2013

(54) INVASION ANALYSIS TO IDENTIFY OPEN TYPES

(75) Inventors: Patrick W. Sathyanathan, Bellevue, WA (US); Ten H. Tzen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/975,913

(22) Filed: Dec. 22, 2010

(65) Prior Publication Data
US 2012/0167091 A1   Jun. 28, 2012

(51) Int. Cl.
G06F 9/44   (2006.01)
G06F 9/45   (2006.01)

(52) U.S. Cl.
USPC ............ 717/154; 717/114; 717/162; 717/165

(58) Field of Classification Search
None
See application file for complete search history.

(56) References Cited

U.S. PATENT DOCUMENTS

| | | | |
|---|---|---|---|
| 5,488,727 A * | 1/1996 | Agrawal et al. ............... | 717/154 |
| 5,696,974 A * | 12/1997 | Agrawal et al. ............... | 717/152 |
| 5,915,114 A | 6/1999 | McKee et al. | |
| 6,052,526 A * | 4/2000 | Chatt ............................ | 717/136 |
| 6,182,283 B1 * | 1/2001 | Thomson ..................... | 717/153 |
| 6,301,700 B1 * | 10/2001 | Choi et al. ................... | 717/116 |
| 6,687,898 B2 | 2/2004 | Chen et al. | |
| 6,687,899 B1 * | 2/2004 | Shann ........................... | 717/162 |
| 6,754,887 B1 * | 6/2004 | Gil et al. ...................... | 717/116 |
| 6,865,730 B1 * | 3/2005 | Burke et al. .................. | 717/116 |
| 6,948,141 B1 * | 9/2005 | Satya et al. ................... | 716/52 |
| 7,299,449 B2 * | 11/2007 | Ruellan et al. ............... | 717/116 |
| 7,346,901 B2 * | 3/2008 | Syme et al. ................... | 717/148 |
| 7,716,657 B2 * | 5/2010 | Inglis et al. ................... | 717/151 |
| 7,743,368 B2 * | 6/2010 | Das ............................... | 717/151 |
| 7,793,277 B2 * | 9/2010 | Schmidt ........................ | 717/158 |
| 7,856,624 B2 * | 12/2010 | Plum ............................. | 717/140 |
| 7,926,047 B2 * | 4/2011 | Drepper ........................ | 717/151 |
| 8,356,288 B2 * | 1/2013 | Neufeld et al. ............... | 717/131 |
| 2003/0051234 A1 * | 3/2003 | Schmidt ........................ | 717/158 |
| 2004/0117782 A1 * | 6/2004 | Lo ................................ | 717/165 |
| 2004/0128661 A1 | 7/2004 | Ghosh et al. | |
| 2005/0125783 A1 | 6/2005 | Tatge et al. | |
| 2005/0138611 A1 * | 6/2005 | Inglis et al. ................... | 717/151 |
| 2007/0038988 A1 * | 2/2007 | Das ............................... | 717/157 |
| 2008/0034360 A1 | 2/2008 | Bodin et al. | |
| 2010/0180269 A1 * | 7/2010 | Stall et al. ..................... | 717/151 |

OTHER PUBLICATIONS

David Francis Bacon, Fast and Effective Optimization of Statically Typed Object-Oriented Lnaguages, published 1997, pp. 1-154.*

(Continued)

*Primary Examiner* — Tuan Q. Dam
*Assistant Examiner* — Zheng Wei
(74) *Attorney, Agent, or Firm* — Workman Nydegger

(57) ABSTRACT

The automated identification of open types of a multi-function input program. The automated identification of open types is performed without annotations in the input program, but rather by identifying a set of invading types of the program, with each of the invading types being an open type. The identification of invading types may be performed iteratively until the set of invading types no longer grows. The set of open types may be used for any purpose such as perhaps the de-virtualization of an input program during compilation.

20 Claims, 5 Drawing Sheets

(56) References Cited

OTHER PUBLICATIONS

Dean et al., Optimization of Object-Oriented Programs Using Static Class Hierarchy Analysis, Appeared in ECOOP'95, Aug. 1995, pp. 1-25.*

Ishizaki et al., A study of Devirtualization Techniques for a Java Just-In-Time Compiler, published 2000, ACM, pp. 294-310.*

Cierniak et al., Practicing JUDO: Java Under Dynamic Optimizations, published 2000 ACM, pp. 13-26.*

Levin et al., Type-based Optimization for Regular Patterns, published by Department of Computer and Information Science, University of Pennsylvania, Jun. 1, 2005, pp. 1-6.*

Thomas Kistler et al., "Automated Layout of Data Members for Type-Safe Languages", 1998, (10 pages).

John Plevyak et al., "Automatic Interprocedural Optimization for Object-Oriented Languages", Feb. 29, 1996, (16 pages).

Neal Glew et al., "Type-Safe Optimisation of Plugin Architectures", 2005, (18 pages).

* cited by examiner

| | Entry Point Functions | Invading Type | | Egress Point Functions | Escaping Type |
|---|---|---|---|---|---|
| Iteration 0 | 401 | A,K,L | 501A | 411,412 | ab |
| | | | 501B | | |
| Iteration 1 | 401 402 403 404 | ABCDEFGKL | 502A | 411,412,413,414 | abcde |
| | | | 502B | | |
| Iteration 2 | 401 402 403 404 405 406 | ABCDEFGHIJKL | 503A | 411,412,413,414,415 | abcdef |
| | | | 503B | | |
| Iteration 3 | 401 402 403 404 405 406 | ABCDEFGHIJKL | 504 Done | | |

INVASION ANALYSIS TO IDENTIFY OPEN TYPES

BACKGROUND

Type-based optimizations such as de-virtualization in C++ programs depend on knowledge of the complete type hierarchy in the program being optimized. However features such as static libraries, which are linked with the program at build time, and dynamic libraries which are linked at run-time, introduce unknown types which the optimizer does not know about. Without complete knowledge the optimizer can perform program transformations which are incorrect due to being over optimistic. Invasion analysis addresses the problem of determining which parts of the type hierarchy are to be treated conservatively by the optimizer so that it only performs correct optimizations. It is crucial for making type based optimizations practical in a production compiler.

BRIEF SUMMARY

At least one embodiment described herein relates to the automated identification of open types of an input multi-function program. The automated identification of open types is performed without annotations in the input program, but instead by identifying a set of invading types of the program, with each of the invading types being an open type. An object is said to "invade" the program if the object is constructed outside the program and enters the scope of program by some means. The type of an invading object is termed an "invading type". In one embodiment, the set of open types are computed by first identifying an initial set of invading types, and then performing further iterations to identify additional invading types until the set of invading types no longer grows. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 5 illustrates the value of various sets at different iterations of the application of method of FIG. 6 to the program environment of FIG. 4.

DETAILED DESCRIPTION

In accordance with embodiments described herein, open types of a multi-function input program are automatically identified. The automated identification of open types is performed without annotations in the input program, but rather by identifying a set of invading types of the program, with each of the invading types being an open type. An object is said to "invade" the program if the object is constructed outside the program and enters the scope of program by some means. The type of an invading object is termed an "invading type". First, some introductory discussion regarding computing systems will be described with respect to FIG. 1. Then, the embodiments of the automated identification of open types will be described with respect to FIGS. 2 through 6.

Figure 1:
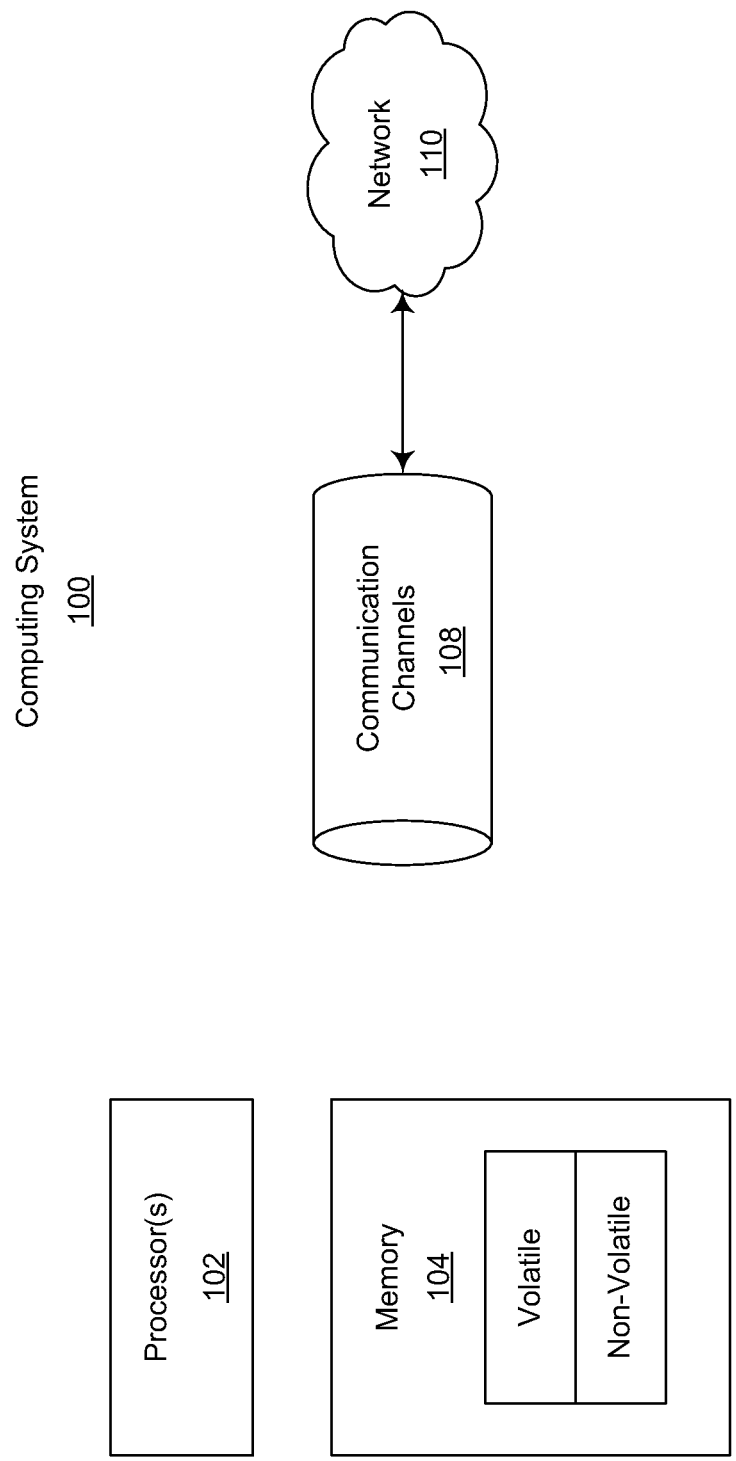
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
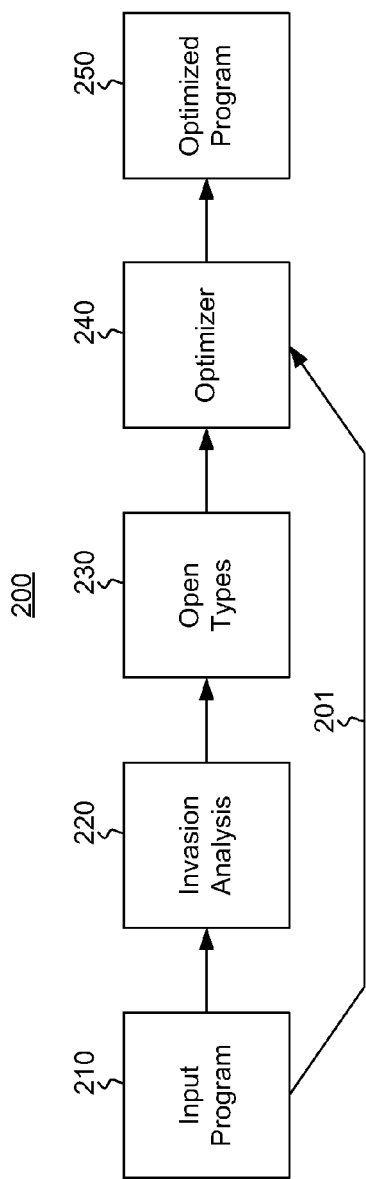
FIG. 2 illustrates an environment in which the principles described herein may operate.

FIG. 2 illustrates an environment 200 in which the principles described herein may operate. The environment 200 may be, for example, internal to a compiler that receives an input program 210. However, the environment 200 may be any environment in which the identification of open types of a type hierarchy of an input program would be useful.

The input program 210 is received by an invasion analysis component 220 that performs invasion analysis in accordance with the principles described herein, and thereby automatically generates a set of open types 230 in the type hierarchy. While the principles described herein are not limited to the purpose of the set of open types, in one embodiment, the purpose is to help type-based optimizer 240 create an optimized program 250, being an optimized version of the input program 210.

In the context of a compiler, for example, the optimizer 240 may perform de-virtualization of the program. This allows more information regarding the actual runtime behavior of the program to be determined. This further reduces the need to make conservative assumptions regarding behavior, thereby improving the accuracy and performance of the compiler. Furthermore, as a result of the optimizations, the run-time performance of the compiled program will improve.

Arrow 201 shows the process flow without the principles described herein in which the input program 210 is provided directly to the optimizer 240. In the case, since the set of open types is not known, perhaps the entire type hierarchy of the program may be assumed to be an open type once it is determined that external modules (e.g., dynamic link libraries or static libraries) are interacting with the program.

Figure 3:
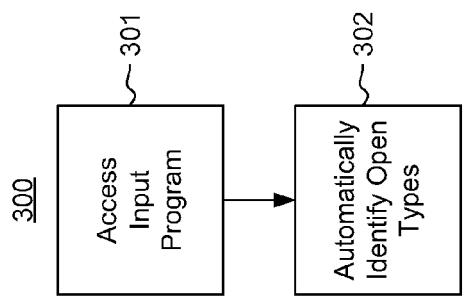
FIG. 3 illustrates a flowchart of a method for identifying open types of an input program.

FIG. 3 illustrates a flowchart of a method 300 for identifying open types of an input program. The method 300 may, for example, be performed by the invasion analysis component 220 of FIG. 2. Upon accessing an input program (act 301) (e.g., input program 210 of FIG. 2) that contains multiple functions, the analysis component (e.g., invasion analysis 220 of FIG. 2), automatically identifies a set of open types (e.g., open types 230) in the type hierarchy (act 302). This identification of the open types is performed automatically, and does not rely on any annotation or other marking of types as being open. The analysis component 220 determines for itself which types are open.

In some embodiments, the analysis component 220 performs the automated identification of open types by identifying a set of invading types of the program, which are each identified as open types.

At this point several terms will be defined. An object is said to "invade" the program if the object is constructed outside the program and enters the scope of program by some means. The type of an invading object that invades a program is termed an "invading type" of the program. An "entry point function candidate" is a function within the program that receives an invading type as an input parameter, though not all invading types are deemed an invading type by being an input type to an entry point function candidate.

An object is said to "escape" the program if it is constructed within the program and leaves the scope of the program and enters a static or dynamic library by some means. The type of an escaping object is termed an "escaping type". An "egress point function candidate" is a function of the static or dynamic library that receives an escaping type as an input parameter though not all escaping types are deemed an escaping type by being an input type to an egress point function candidate.

These terms will further be explained with respect to FIG. 4, which shows an example program environment 400 that includes an input program (represented by the area above the horizontal dividing line), and an external library (represented by the area below the horizontal dividing line). The program is illustrated as including 10 functions 401 through 410. The external library is illustrated also as including 10 functions 411 through 420.

As will be described hereinafter with respect to an interactive process, types A, K and L are included within an initial set of invading types. In the final iteration, however, 12 types A through L are all identified in the final set of invading types. Of course, there may be other types with respect to any of the functions 401 through 410 that are not illustrated in FIG. 4. In this iterative process, function 401 is initially defined as being an entry point candidate function, whereas total set of entry point candidate functions is eventually expanded to include a final set of functions 401 through 406.

In the iterative process to be described hereinafter, type "a" is included within an initial set of escaping types. In the final iteration, however, types "a" through "f" are all identified in the final set of escaping types. Of course, there may be other types with respect to any of the functions 411 through 420 that are not illustrated in FIG. 4. In this iterative process, function 411 is initially defined as being an egress point candidate function, whereas total set of egress point candidate functions is eventually expanded through the iterative process to include a final set of functions 411 through 415.

The terms "invading type", "entry point function candidate", "escaping type", and "egress point function candidate" will now be described with respect to example C++ code. Consider the entry point function "X*foo(Y*y)". The return type X is an escaping type (foo is called from outside the program so its return value escapes). The parameter type Y is an invading type. Now consider the egress point function "U*bar(V*v)". In this case, the return type U is an invading type (bar is called by the program so its return value invades). The parameter type V is an escaping type. Virtual functions of invading types may be determined to be egress point function candidates. Virtual functions of escaping types may be determined to be entry point function candidates.

Figure 4:
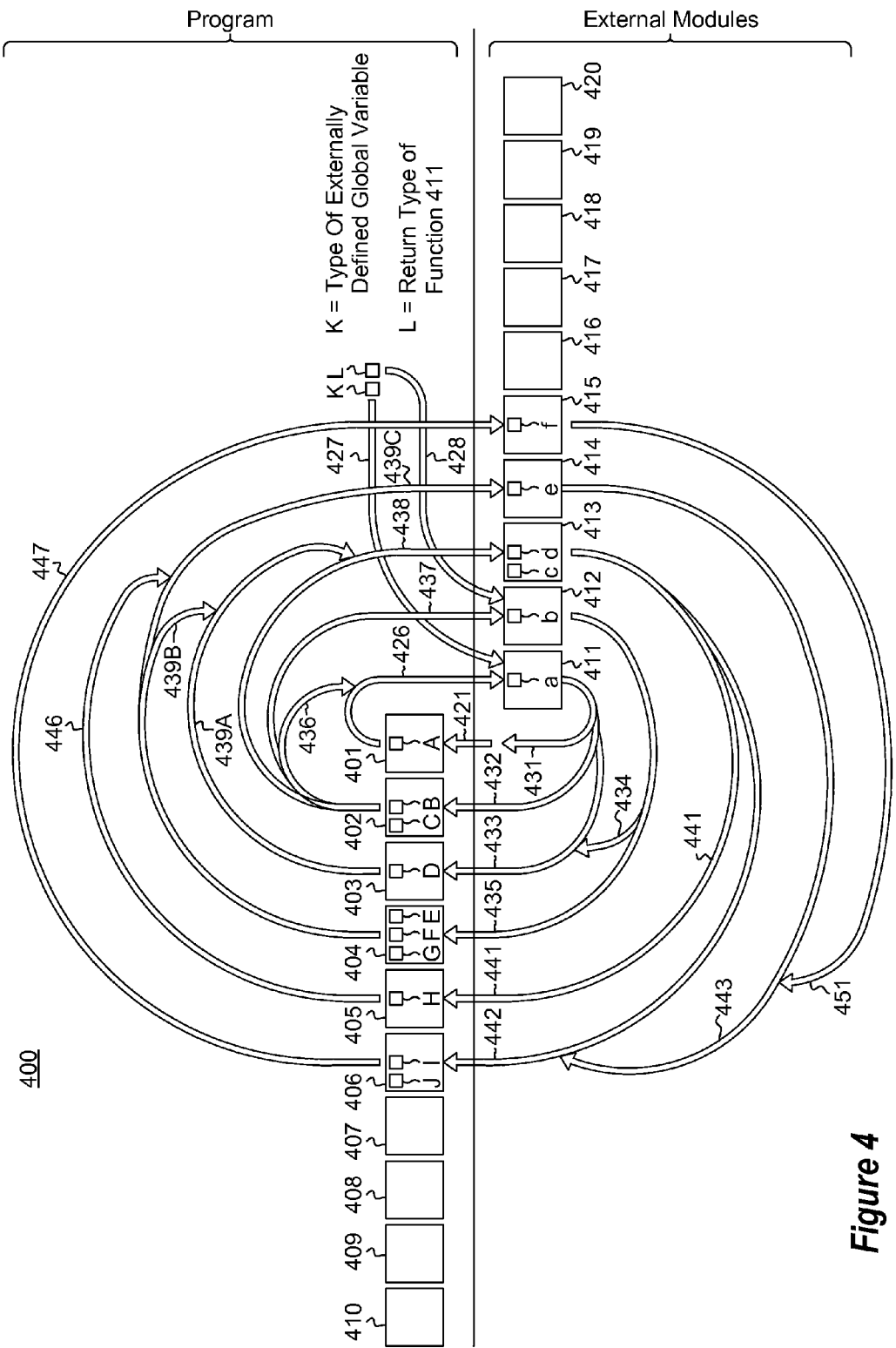
FIG. 4 illustrates a program environment that represents an example program environment in which the process of identifying open types may operate.
Figure 6:
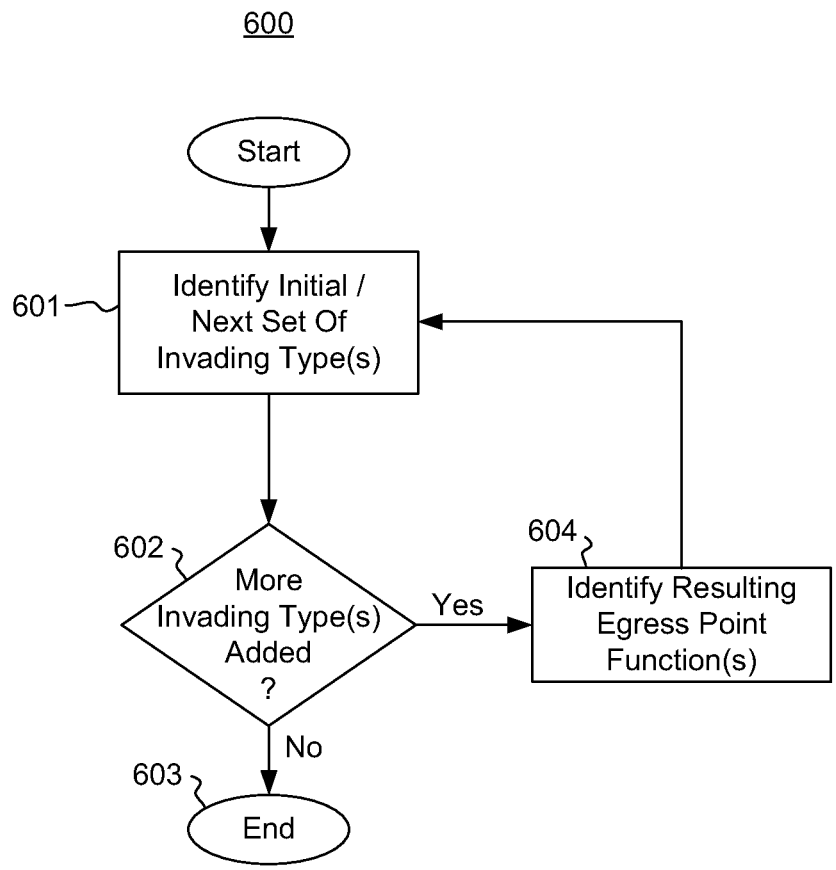
FIG. 6 illustrates a flowchart of a method for formulating a set of entry invading types.

Referring to FIG. 4, the program environment 400 is just a simple example that will be used to illustrate a specific instance of the broader principles describe herein. The principles may be applied to any program of any size, in any environment, with any number of external functions. An example of a process for automatically identifying open types of a program will now be described with reference to FIGS. 4, 5 and 6. As previously mentioned, FIG. 4 illustrates a program environment 400 that represents an example program environment in which the process of identifying open types may operate. FIG. 6 illustrates a flowchart of a method 600 for formulating a set of entry point function candidates. As the process is iterative, FIG. 5 illustrates the value of various sets at different iterations of the application of method 600 to the program environment 400 of FIG. 4.

The method 600 begins by identifying an initial set of invading types (act 601). As previously mentioned, an object is said to "invade" the program if the object is constructed outside the program and enters the scope of program by some means. The type of an invading object is termed an "invading type". There are three ways described herein in which a type may be initially identified as invading, although the principles of the present invention are not limited to those three described ways.

One way to identify at least part of the initial set of open types (act 601) is to identify an initial set of entry point function candidates, and identify the parameters passed by the external library to each of the initial set of entry point function candidates as being an invading type. For instance, it is known that the main function of a C++ program is an entry point function, and thus abundantly satisfies the definition entry point function candidate. However, there may be other functions as well that may be included as known entry point function candidates, and thus may be included in the initial set of entry point function candidates. Referring to FIG. 4, there is but one entry point function candidate in the initial set of entry point function candidates; namely, entry point function 401, which receives invading type A from external to the program as represented by the function call arrow 421. Thus, type A is identified as an invading type, and thus an open type.

Another way to identify part of the initial set of open types (act 601) is to identify an initial egress point function candidate, and identify return types of the egress point function candidate. For instance, imported functions of the external library may be determined to be in the initial set of egress point function candidates. Those imported functions may be examined to identify their return types as being invading types. For instance, referring to FIG. 4, the example will assume that there is only one egress point function candidate 411 in the initial set of egress point function candidates, and that the egress function candidate 411 has one return type L. Thus, type L is identified as an invading type, and thus an open type.

A third way to identify part of the initial set of open types (act 601) is to identify the type of any externally defined global variables as being invading types. For instance, in FIG. 4, suppose that type K is the type of an externally defined global variable. Type K is thus defined as an invading type, and thus an open type.

Referring to FIG. 5, this state is represented by the left half of iteration 0. Specifically, the initial set of invading types (and thus also the initial set of open types) is identified as including invading types A, K and L. The initial set of entry point function candidates includes only function 401. Although not illustrated in FIG. 5, there are also an initial set of escaping types identified (e.g., escaping type "a"), and an initial set of egress point function candidates identified (e.g., egress point function candidate 411) as previously mentioned.

Although not illustrated in FIG. 4, whenever a type is discovered to be invading, all types that are reachable from it are also determined to be invading. For instance, consider the following C++ code example:

```
class R {
    S * s;
};
class S {
    T * t;
};
```

In this example, if class R becomes an invading type, then so do classes S and T since the invading object of type R could point to an unknown subclass of S via its field "s", and in turn that object of type S could point to an unknown subclass of T via its field "t". Likewise, if class R becomes an escaping type, then so do classes S and T.

The method 600 then continues on different paths, depending on whether there were more invading types discovered in this iteration (Yes in decision block 602), or whether there were no newly discovered invading types in the iteration (No in decision block 602). In this case, there were new invading type added to the open types set (i.e., the invading types A, K and L), and thus processing proceeds to act 604. This transition is represented in FIG. 5 by arrow 501A.

At this point, the method 600 identifies a resulting set of egress point function candidates that have one or more escaping types (act 604). The resulting set of egress point function candidates represents those egress point function candidates that would be called by the program if one or more of the initial set of entry point function candidates were called from outside the program. Although the invading type is an unknown type, it is an unknown subclass of a base type that is defined in the program. Accordingly, the virtual functions of that base type, which are inherited by the invading type are also defined in the program. Thus, in each iteration, given a set of invading types, a resulting set of egress point function candidates may be identified from the virtual functions of the base type of the invading type.

In this case, the invading type A is determined to have a corresponding virtual function (function 411) as represented by arrow 426, invading type K is determined to have a corresponding virtual function (also function 411) as represented by arrow 427, and invading type L is determined to have a corresponding virtual function (function 412) as represented by arrow 428. Thus, the new set of egress point function candidates includes functions 411 and 412, and their input parameters (i.e., parameters "a" and "b") are identified as being the next set of escaping parameters. In addition to the input types to egress point function candidates, additional escaping types may also be identified from return types of the current set of entry point function candidates. Either source may provide new escaping types at each iteration. However, in the specific example of FIGS. 4 and 5, only the first source (i.e., the input types provided to egress point function candidates) results in new escaping types at each iteration in order to avoid complicating the example too much. This state is represented in the right half of iteration 0 in FIG. 5. The method 600 then continues with the next iteration (iteration 1) as represented by arrow 501B in FIG. 5.

The method 600 continues into iteration 1 by identifying the next set of invading types and entry point function candidates (act 601). The next set of entry point function candidates represents those entry point function candidates that could be called if one or more of the set of egress point function candidates from the prior iteration were called by the program. In one embodiment, the next set of entry point candidates are obtained by assigning each of the virtual functions of each of the escaping types as being in the next set of entry point candidate functions. The input parameter types of the next set of entry point functions are identified as being invading types, and thus open types.

Referring to FIG. 4, there are four entry point function candidates in the next set of entry point function candidates; namely, entry point candidates 401 through 404. Entry point function candidate 401 is a virtual function of escaping type "a" (as represented by arrow 431). However, entry point function 401 was also already in the initial set of entry point function candidates. Entry point function candidate 402 is also a virtual function of escaping type "a" (as represented by arrow 432) and is thus added to the next set of entry point function candidates. Entry point function candidate 403 is also a virtual function of escaping type "a" (as represented by arrow 433) and is also thus added to the set of entry point function candidates. Entry point function candidate 403 is also a virtual function of escaping type "b" (as represented by arrow 434) and thus would be added to the set of entry point function candidates for this reason as well. Entry point function candidate 404 is a virtual function of escaping type "b" as represented by arrow 435) and is thus added to the set of entry point function candidates. Thus, the next set of entry point function candidates includes functions 401 through 404, and their corresponding input parameters A though G and K and L represent the next set of invading types. In addition to the input types to entry point function candidates, additional invading types may also be identified from return types of the current set of egress point function candidates. Either source may provide new invading types at each iteration. However, in the specific example of FIGS. 4 and 5, only the first source (i.e., the input types provided to entry point function candidates) results in new invading types at each iteration in order to avoid complicating the example too much. Referring to FIG. 5, this state is represented by the left half of iteration 1. Furthermore, since new invading types were discovered in this iteration (B through G) (Yes in decision block 602) processing again proceeds to act 604. This transition is represented in FIG. 5 by arrow 502A.

At this point, for iteration 1, the method 600 identifies a resulting set of egress point function candidates that have one or more escaping types (act 604). Since only new invading types are to be evaluated (the evaluation has already been performed for invading type A), the virtual functions for new invading types B, C, D, E, F, and G are examined. Function 411 is a virtual function of invading type B (as represented by arrow 436), but function 411 is already in the set of egress point function candidates. Function 412 is a virtual function of invading type B (as represented by arrow 437), but function 412 is also already in the set of egress point function candidates. Function 413 is a virtual function of invading type B (as represented by arrow 438), is a virtual function of invading type D (as represented by arrow 439A, and is a virtual function of invading type F (as represented by arrow 439B), and thus function 413 is added to the next set of egress point function candidates. Function 414 is a virtual function of invading type F (as represented by arrow 439C), and thus function 414 is added to the next set of egress point function candidates. Invading types C, E and G do not happen to have any virtual functions, so their existence does not result in any new egress point function candidates. Thus, the next set of egress point function candidates includes functions 411 through 414, and their input parameters "a" through "e" are the new set of escaping types. This state is represented in the right half of iteration 1 in FIG. 5. The method 600 then continues with the next iteration (iteration 2) as represented by arrow 502B in FIG. 5.

The method 600 continues into iteration 2 by identifying the next set of invading types and entry point function candidates (act 601). Since only new escaping types are to be evaluated (the evaluation has already been performed for escaping types "a" and "b"), the virtual functions for new escaping types "c", "d" and "e" are examined. Function 405 is a virtual function of escaping type "d" (as represented by arrow 441), and thus function 405 is added to the next set of entry point function candidates. Function 406 is a virtual function of escaping type "d" (as represented by arrow 442), and is a virtual function of escaping type "e" (as represented by arrow 443), and thus function 406 is added to the next set of entry point function candidates. Escaping type "c" does not happen to have any virtual functions, so its existence does not result in any new entry point function candidates. Thus, the next set of entry point function candidates includes functions 401 through 406, and their input parameters A though J are included within the next set of invading types so that the next set of invading types includes invading types A through L. This state is represented in the left half of iteration 2 in FIG. 5. Furthermore, since new invading types were discovered in this iteration (H, I and J) (Yes in decision block 602) processing again proceeds to act 604. This transition is represented in FIG. 5 by arrow 503A.

At this point, for iteration 2, the method 600 identifies a resulting set of egress point function candidates that have one or more escaping types (act 604). Since only new invading types are to be evaluated (the evaluation has already been performed for invading types A through G), the virtual functions for new invading types H, I and J are examined. Function 414 is a virtual function of invading type H (as represented by arrow 446), but function 414 is already in the set of egress point function candidates. Function 415 is a virtual function of invading type I (as represented by arrow 447), and thus function 415 is added to the next set of egress point function candidates. Invading type J does not happen to have any virtual functions, so its existence does not result in any new egress point function candidates. Thus, the next set of egress point function candidates includes functions 411 through 415, and their input parameters "a" through "f" are the new set of escaping types. This state is represented in the right half of iteration 2 in FIG. 5. The method 600 then continues with the next iteration (iteration 3) as represented by arrow 503B in FIG. 5.

The method 600 continues into iteration 3 by identifying the next set of invading types and entry point function candidates (act 601). Since only new escaping types are to be evaluated (the evaluation has already been performed for escaping types "a" through "e"), the virtual functions for new escaping type "f" is examined. Escaping type "f" only has one virtual function, which is function 406 (as represented by arrow 451). However, function 406 is already in the set of entry point function candidates. Thus, the existence of the new escaping type "f" does not result in the discovery of any new invading types. Accordingly, since there are no new invading types found (No in decision block 602), the method ends (act 603) as represented in FIG. 5 by arrow 504. The final set of invading types (in this case, invading types A through K) is thus the resulting set of open types in the type hierarchy. In this case, all of the open types of the type hierarchy of the program have been discovered.

Accordingly, the principles described herein provide an automated mechanism for identifying open types of a program. The automation is accomplished by type analysis, and not by relying on developer annotations. To further assist, a specific code example showing invasion analysis will now be described. First, invasion analysis with respect to a simple C++ program will be described. Then, escape analysis with respect to another simple C++ program will be described. Finally, the use of these principles to address type casting will be described.

Consider the following simple C++ example:

```
// main.cpp
class A {
   virtual B * foo( ) { return new B( ); }
};
class B {
};
_declspec(dllimport) A * makeA( );
void main( )
{
   A * a = makeA( );
   B * b = a->foo( );
}
// dll.cpp
class UnseenSubclassOfA : public A {
   virtual B * foo( ) { return new UnseenSubclassOfB( ); }
};
class UnseenSubclassOfB : public B {
};
_declspec(dllexport) A * makeA( )
{
   return new UnseenSubclassOfA( );
}
```

Here, in function "main", "a" will point to "class UnseenSubclassOfA" because of the implementation of "makeA", which is an egress point function candidate. So, "class A" has been detected to be an invading type. Now, the virtual call "a->foo( )" will call "UnseenSubclassOfA::foo" defined within the DLL where "makeA" is implemented and will thus return the unknown sub-class of "class B", thus making "class B" to be an invading type. This illustrates the transitive nature of invasion.

There are two inter-dependent relations between escaped types and entry points of the program, which may be used in the analysis. First, each virtual method of an escaped type is a potential entry point. For each entry point, if its return type is a pointer to an aggregate type, then that aggregate type and all the types reachable from it become escape types. Likewise any type that is returned to the caller via a parameter is also an escape type. The following example illustrates this point.

```
// dll.cpp
class A {
   virtual B * foo( ) { return new B( ); }
};
class B {
};
_declspec(dllexport) A * DllMain( )
{
   A * a = new A( );
   return a;
}
// main.cpp
class UnseenSubclassOfA : public A {
   virtual B * foo( ) { return new UnseenSubclassOfB( ); }
};
class UnseenSubclassOfB : public B {
};
_declspec(dllimport) A * DllMain( );
void main( )
{
   A * a = DllMain( );
   B * b = a->foo( );
}
```

From the point of view of dll.cpp, function "DllMain" is an entry point and hence its return type "class A" is an escaping type. Because of this the virtual function "A::foo" becomes an entry point, and in turn causes its return type "class B" to become escaped. Note that neither "class A" nor "class B" are invading types with respect to dll.cpp, and are hence not open types.

Here is another example for escaping types.

```
// main.cpp
class A {
   virtual B * foo( ) { return new B( ); }
};
class B {
   virtual int bar(C * c);
};
class C { };
_declspec(dllimport) void useA(A * a);
int main( )
{
   A * a = new A( );
```

```
        return useA(a);
    }
    // dll.cpp
    class UnseenSubclassOfA : public A {
        virtual int foo(B * b) { ...; }
    };
    class UnseenSubclassOfC : public C {
    };
    _declspec(dllexport) int useA(A * a)
    {
        B * b = a->foo( );
        C * c = new UnseenSubclassOfC( );
        return b->bar(c);
    }
```

In this example, function "useA" is an egress point, through which "class A" becomes an escaped type. This causes function "A::foo" to become an entry point, which in turn causes its return type "class B" to become escaped. Since "class B" is escaped, its virtual method "B::bar" becomes an entry point from which "class C" becomes an invading type. In this example "class C" is the only open type with respect to main.cpp. This example also illustrates the interaction between escaped and invading types.

The escape analysis described in sub-section 6.5 depends on the program having correct parameter types for function types to correctly detect escape through out parameters. For example the following function type can be correctly analyzed to determine the set of escaping types if it is an entry point:

```
    class A {
    };
    // Note the out parameter type is correctly declared.
    void foo(A ** ppA)
    {
    }
```

The process can detect that if "foo" were found to be an entry point, then "class A" and all the types reachable from that class via its fields become escaped types. However, real world code is not always as well typed, and the best example of this is COM. In COM most of the method out parameters are typed as "void **". Consider one of the standard COM virtual methods "QueryInterface" which is declared and usually implemented as follows:

```
// Return an object that implements the specified interface
// through the second out parameter.
HRESULT QueryInterface(IID * interfaceID, void ** ppvObj)
{
    .
    .
    .
    *ppvObj = "address of object that implements the specified interface";
}
```

Here there is an escaping object of a type that cannot be determined from the type of parameter "ppvObj" since that is specified as "void **". To handle this case with minimal loss of precision, the process may include a flow-sensitive propagation of unsafe out parameters from the initial set of entry points given to the backend by the linker. The main steps in the process are as follows:
1) The call-graph node for each function has one bit for each of its parameters which indicates whether that parameter could have flowed from an ill-typed out parameter of an entry point. This will be termed the "unsafe out parameter" bit.
2) For each initial entry point we set the "unsafe out parameter" bits based on the type. The design will use heuristics to decide when to set this bit. The initial version of the heuristic will check if the type is "void **" as this is the commonly used COM pattern.

Real world programs are not type-safe and have unsafe casting. Accordingly, the processing may also incorporate unsafe cast analysis. The analysis can be made as strong or as weak as possible during tuning of the implementation to achieve the right balance between correctness and precision. The following is an example expressed in C++ code.

```
// Checks for unsafe casts to a class or struct pointer
// type and flags the type as Open if the cast is unsafe.
void CheckForUnsafeCast(TUPLE * destination, TUPLE * source)
{
    PRICHTYPE resultType = TypeSystem::GetType(destination);
    PRICHTYPE fromType = TypeSystem::GetType(source);
    if ((fromType != NULL) && (resultType != NULL))
    {
        if (TypeSystem::IsPointerToClassOrStructure(resultType)
            && TypeSystem::IsScalarType(fromType))
        {
            ASSERTNR(TYPE_REFERENT_TYPE(resultType) != NULL);
            PRICHTYPE                baseType                =
TypeSystem::NonModifierAliasedBaseType(TYPE_REFERENT_TYPE
(resultType))
;
            ECGAddUnsafeCastInvadingType(baseType);
        }
    }
}
```

As mentioned in the previous section this analysis can also be augmented to detect escaping types by checking for unsafe casts from a pointer to aggregate, to a scalar type. This code handles casts from a scalar type to a pointer to aggregate type, which causes the aggregate type to become invading. Conversely, if a pointer to an aggregate type is cast to a scalar type, it will cause the aggregate type to become escaped. Again, this is due to the dual nature of invasion and escape.

The unsafe cast analysis also includes a more precise version that actually tracks flow of values using SSA which is available during the Top-Down pass. This is to handle situations where the return value of the Windows NT "GetProcAddress" API used to make an indirect function call which then serves as an invasion point. This is required for precisely handling the typical usage of this API, where the return value is cast to a function pointer whose type does not have accurate parameter and return value type information.

One more source of invading types are C++ exceptions, where an object can be thrown from a DLL or static library, and caught inside the application. Conversely, any object that is constructed and thrown from within the application, and caught outside it has an escaping type. If a "catch" clause in the program specifies the type of the exception then we can simply add that type to the initial set of invading types. Likewise the type of an object specified in a "throw" statement can be added to the initial set of escaping types.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical storage devices having thereon computer-executable instructions that are structured such that, when executed by one or more processors of a computing system, cause the computing system to perform a method for identifying open types of an input program that is to be optimized prior to runtime, the method comprising acts of:

inputting at an invasion analysis component an input program that is to be optimized prior to runtime the input program including a plurality of functions and a plurality of object types used by one or more of the functions;

the invasion analysis component automatically identifying an initial set of open types without using annotations of open types in the input program by identifying an initial set of invading types of objects constructed outside the input program which enter the input program in one or more ways;

the invasion analysis component then automatically performing one or more iterations using the initial set of invading to continue identifying further invading types and adding the identified further invading types to the initial set of invading types until no further invading types are found; and sending a final set of open types that correspond to the set of all invading types identified by the iterations performed by the invasion analysis component to an optimizer that uses the identified open types to optimize the input program prior to runtime.

2. The computer program product in accordance with claim 1, wherein the method implemented by the executable instructions further comprises accessing at the invasion analysis component an external library including a plurality of functions and a plurality of object types used by one or more of the functions of the external library.

3. The computer program product in accordance with claim 1, wherein identifying an initial set of invading types comprises:

an act of identifying one or more entry point functions of the input program which receive as an input parameter an invading object type.

4. The computer program product in accordance with claim 2, wherein identifying an initial set of invading types comprises:

an act of identifying one or more egress point functions of the external library which receive as an input parameter an escaping object type constructed inside the input program.

5. The computer program product in accordance with claim 1, wherein identifying an initial set of invading types comprises:

an act of identifying one or more externally defined global variables as being invading object types constructed outside the input program which are received as an input parameter at one or more of the external library functions.

6. The computer program product in accordance with claim 2, wherein identifying an initial set of invading types of objects constructed outside the input program which enter the input program in one or more ways is performing by one or more of the following acts:

identifying one or more entry point functions of the input program which receive as an input parameter an invading object type;

identifying one or more egress point functions of the external library which receive as an input parameter an escaping object type constructed inside the input program;

identifying one or more externally defined global variables as being invading object types constructed outside the input program which are received as an input parameter at one or more of the external library functions.

7. The computer program product in accordance with claim 6, wherein performing one or more iterations using the initial set of invading types to continue identifying further invading types and adding the identified further invading types to the initial set of invading types until no further invading types are found comprises the following for each iteration:

an act of identifying a next set of escaping types based on a current set of invading types; and an act of identifying a next set of invading types based on the next set of escaping types.

8. The computer program product in accordance with claim 7, wherein the act of identifying a next set of escaping types based on a current set of invading types comprises:

an act of identifying virtual functions of the current set of invading types as being a next set of egress point function candidates;

an act of identifying the input parameter types of the next set of egress point function candidates as being the next set of escaping types; and an act of identifying the return types of the current set of entry point function candidates as adding to the next set of escaping types.

9. The computer program product in accordance with claim 7, wherein the act of identifying a next set of invading types based on the next set of escaping types comprises:

an act of identifying virtual functions of the next set of escaping types as being a next set of entry point function candidates;

an act of identifying the input parameter types of the next set of entry point function candidates as being the next set of invading types; and an act of identifying the return types of the next set of egress point function candidates as adding to the next set of invading types.

10. The computer program product in accordance with claim 2, wherein the act of iteratively augmenting the set of invading types comprises the following for each iteration:

an act of identifying virtual functions of the current set of invading types as being a next set of egress point function candidates;

an act of identifying the input parameter types of the next set of egress point function candidates as being the next set of escaping types;

an act of identifying the return types of the next set of entry point function candidates as adding to the next set of escaping types;

an act of identifying virtual functions of the next set of escaping types as being a next set of entry point function candidates;

an act of identifying the input parameter types of the next set of entry point function candidates as being the next set of invading types; and an act of identifying the return types of the next set of egress point function candidates as adding to the net set of invading types.

11. A computer-implemented method for identifying open types of an input program that is to be optimized prior to runtime, the computer-implemented method comprising acts of:

inputting at an invasion analysis component an input program that is to be optimized prior to runtime, the input program including a plurality of functions and a plurality of object types used by one or more of the functions;
the invasion analysis component automatically identifying an initial set of open types without using annotations of open types in the input program by identifying an initial set of invading types of objects constructed outside the input program which enter the input program in one or more ways;
the invasion analysis component then automatically performing one or more iterations using the initial set of invading types to continue identifying further invading types and adding the identified further invading types to the initial set of invading types until no further invading types are found; and
sending a final set of open types that correspond to the set of all invading types identified by the iterations performed by the invasion analysis component to an optimizer that uses the identified open types to optimize the input program prior to runtime.

12. The method in accordance with claim 11, wherein the method implemented by the executable instructions further comprises accessing at the invasion analysis component an external library including a plurality of functions and a plurality of object types used by one or more of the functions of the external library.

13. The method in accordance with claim 11, wherein identifying an initial set of invading types comprises:
an act of identifying one or more entry point functions of the input program which receive as an input parameter an invading object type.

14. The method in accordance with claim 12, wherein identifying an initial set of invading types comprises:
an act of identifying one or more egress point functions of the external library which receive as an input parameter an escaping object type constructed inside the input program.

15. The method in accordance with claim 11, wherein identifying an initial set of invading types comprises:
an act of identifying one or more externally defined global variables as being invading object types constructed outside the input program which are received as an input parameter at one or more of the external library functions.

16. The method in accordance with claim 12, wherein identifying an initial set of invading types of objects constructed outside the input program which enter the input program in one or more ways is performing by one or more of the following acts:
identifying one or more entry point functions of the input program which receive as an input parameter an invading object type;
identifying one or more egress point functions of the external library which receive as an input parameter an escaping object type constructed inside the input program;
identifying one or more externally defined global variables as being invading object types constructed outside the input program which are received as an input parameter at one or more of the external library functions.

17. The method in accordance with claim 16, wherein performing one or more iterations using the initial set of invading types to continue identifying further invading types and adding the identified further invading types to the initial set of invading types until no further invading types are found comprises the following for each iteration:
an act of identifying a next set of escaping types based on a current set of invading types; and
an act of identifying a next set of invading types based on the next set of escaping types.

18. The method in accordance with claim 17, wherein the act of identifying a next set of escaping types based on a current set of invading types comprises:
an act of identifying virtual functions of the current set of invading types as being a next set of egress point function candidates;
an act of identifying the input parameter types of the next set of egress point function candidates as being the next set of escaping types; and
an act of identifying the return types of the current set of entry point function candidates as adding to the next set of escaping types.

19. The method in accordance with claim 17, wherein the act of identifying a next set of invading types based on the next set of escaping types comprises:
an act of identifying virtual functions of the next set of escaping types as being a next set of entry point function candidates;
an act of identifying the input parameter types of the next set of entry point function candidates as being the next set of invading types; and
an act of identifying the return types of the next set of egress point function candidates as adding to the next set of invading types.

20. A computer system for compiling an optimized input program prior to runtime, comprising:
one or more processors; and
one or more memory devices storing executable instructions for implementing a method for identifying open types of the input program, the executable instructions causing the one or more processors to perform the following:
inputting at an invasion analysis component an input program that is to be optimized prior to runtime, the input program including a plurality of functions and a plurality of object types used by one or more of the functions;
accessing at the invasion analysis component an external library including a plurality of functions and a plurality of object types used by one or more of the functions of the external library;
the invasion analysis component automatically identifying an initial set of open types without using annotations of open types in the input program by identifying an initial set of invading types of objects constructed outside the input program which enter the input program in one or more ways, by performing one or more of the following acts:
identifying one or more entry point functions of the input program which receive as an input parameter an invading object type;
identifying one or more egress point functions of the external library which receive as an input parameter an escaping object type constructed inside the input program;
identifying one or more externally defined global variables as being invading object types constructed outside the input program which are received as an input parameter at one or more of the external library functions;
the invasion analysis component then automatically performing one or more iterations of the following acts:

determining from the initial set of invading types one or more new egress functions not previously identified and any corresponding new egress types of the one or more new egress functions, and then determining from the corresponding new egress types any new entry point functions not previously identified and any corresponding new invading types of the one or more new entry point functions;

adding the any corresponding new invading types to the initial set of invading types; and the invasion analysis component continuing to perform iterations of said acts until no new invading types are added to the initial set of invading types; and sending a final set of open types that correspond to the set of invading types identified by the invasion analysis component to an optimizer that uses the identified open types to optimize the input program prior to runtime.

* * * * *